US011683767B2

(12) United States Patent
Wentink et al.

(10) Patent No.: US 11,683,767 B2
(45) Date of Patent: Jun. 20, 2023

(54) SYNCHRONIZATION SHORT INTER-FRAME SPACE (SIFS)

(71) Applicant: QUALCOMM Incorporated, San Diego, CA (US)

(72) Inventors: Maarten Menzo Wentink, Nijmegen (NL); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 40 days.

(21) Appl. No.: 17/219,356

(22) Filed: Mar. 31, 2021

(65) Prior Publication Data

US 2021/0360547 A1 Nov. 18, 2021

Related U.S. Application Data

(60) Provisional application No. 63/023,663, filed on May 12, 2020.

(51) Int. Cl.
*H04W 56/00* (2009.01)
*H04W 74/08* (2009.01)

(52) U.S. Cl.
CPC ..... *H04W 56/001* (2013.01); *H04W 74/0808* (2013.01)

(58) Field of Classification Search
CPC .. H04B 7/183; H04B 7/18589; H04B 7/2678; H04B 7/2681; H04J 3/06; H04J 3/0617;
(Continued)

(56) References Cited

U.S. PATENT DOCUMENTS 8,995,406 B2 * 3/2015 Merlin ................ H04W 74/085
370/336
9,408,230 B2 * 8/2016 Zhu ...................... H04W 74/002
(Continued)

FOREIGN PATENT DOCUMENTS

EP 2947948 A1 11/2015

OTHER PUBLICATIONS

Chu (NXP) L., et al., "Multiple Link Operation Follow Up", IEEE Draft, IEEE 802.11-20/0487r4, 11-20-0487-04-00BE-MULTIPLE-LINK-OPERATION-FOLLOW-UP, IEEE-SA Mentor, Piscataway, NJ, USA, vol. 802.11 EHT, 802.11be, No. 4, Apr. 23, 2020 (Apr. 23, 2020), pp. 1-15, XP068172757, Mar. 1, 2020, Retrieved from the Internet: URL: https://mentor.ieee.org/802.11/dcn/20/11-20-0487-04-00be-multiple-link-operation-follow-up.pptx [retrieved on Apr. 23, 2020] p. 4, p. 13.
(Continued)

*Primary Examiner* — Alpus Hsu
(74) *Attorney, Agent, or Firm* — Arent Fox, LLP/Qualcomm

(57) ABSTRACT

This disclosure provides methods, devices and systems for synchronizing an end of an exchange of frames during a transmission opportunity (TXOP) with a target synchronization time using a synchronization short inter-frame space (SynSIFS) before a transmission by a wireless communication device that controls the medium. The wireless communication device obtains control of the medium for the TXOP by completing a CCA procedure. An exchange of frames during the TXOP includes transmissions from the wireless communication device and responses from other devices while the wireless communication device controls the medium. A duration of the SynSIFS may be adjustable at a microsecond granularity. Accordingly, the wireless communication device may select a duration of the SynSIFS that
(Continued)

allows alignment of the end of the exchange with the target synchronization time. The wireless communication device also may adjust a number of symbols in the transmission from the wireless communication device.

30 Claims, 8 Drawing Sheets

(58) Field of Classification Search
CPC ..... H04J 3/0635; H04L 27/26; H04W 56/001; H04W 74/002; H04W 74/0808; H04W 74/0833
See application file for complete search history.

(56) References Cited

U.S. PATENT DOCUMENTS

| | | | | |
|---|---|---|---|---|
| 9,426,764 | B2* | 8/2016 | Seok | H04W 52/0216 |
| 9,622,262 | B2* | 4/2017 | Zhu | H04W 74/002 |
| 9,686,763 | B2* | 6/2017 | Seok | H04W 56/0085 |
| 9,706,572 | B2* | 7/2017 | Bhushan | H04W 74/0816 |
| 10,306,672 | B2* | 5/2019 | Zhu | H04W 74/002 |
| 10,721,747 | B2* | 7/2020 | Adachi | H04B 1/16 |
| 11,317,436 | B2* | 4/2022 | Lou | H04W 74/006 |
| 2018/0007561 | A1* | 1/2018 | Adachi | H04W 74/002 |

OTHER PUBLICATIONS

International Search Report and Written Opinion—PCT/US2021/025419—ISA/EPO—dated Jun. 10, 2021.

Jang (LG Electronics) L, et al., "Multi-link Aggregation: Synchronized PPDUs on Multiple Links", IEEE 802.11-20/0415r4, IEEE Draft, IEEE-SA Mentor, Piscataway, NJ, USA, vol. 802.11 EHT, 802.11be. No. 4, Apr. 17, 2020), pp. 1-15, XP068167524, 20200316, Retrieved from the Internet: URL: https://mentor.ieee.org/802.11/dcn/20/11-20-0415-04-00be-multi-link-aggregation-synchronized-ppdus-on-multiple-links.pptx[retrieved on Apr. 17, 2020] p. 3.

An (Broadcom Inc) Z., et al., "MLO A-Synchronize and Synchronize Operation Discussions", IFFF 302.11-20/291 r1, IEEE Draft, 11-20-0291-01-OOBE-MLO-ASYNC-AND-SYNC-OPERATION-DISCUSSION, IEEE-Sa Mentor, Piscataway, Nj, USA, vol. 802.11 EHT, 802.11be, No. 1, Apr. 6, 2020 (2020-04-06), pp. 1-22, XP068167358, 2020-01-20, Retrieved from the Internet: URL: https://mentor.IEEE.org/802.11/dcn/20/11-20-0291-01-00be-mlo-async-and-sync-operation-discussion.pptx [retrieved on 2020-04-06] p. 4, p. 12.

* cited by examiner

SYNCHRONIZATION SHORT INTER-FRAME SPACE (SIFS)

CROSS REFERENCE TO RELATED APPLICATIONS

This application claims priority to U.S. Provisional Application No. 63/023,663 entitled "Synchronization Short Inter-Frame Space (SIFS)," filed May 12, 2020, which is assigned to the assignee hereof, and incorporated herein by reference in its entirety.

TECHNICAL FIELD

This disclosure relates generally to wireless communication, and more specifically, to synchronization of radio frames.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN. The 802.11 family of standards conventionally provides an asynchronous network.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communication by an apparatus of a wireless communication device. The method includes acquiring access to a wireless medium via a clear channel assessment (CCA) procedure. The method includes transmitting within an exchange of frames during a transmission opportunity (TxOP) of the wireless communication device after a duration of a synchronization short inter-frame space (SIFS), where the duration of the synchronization SIFS enables alignment of an end of the exchange with a target synchronization boundary.

The wireless communication device includes at least one modem; at least one processor communicatively coupled with the at least one modem; and at least one memory communicatively coupled with the at least one processor and storing processor-readable code. When the processor-readable code is executed by the at least one processor in conjunction with the at least one modem, the wireless communication device is configured to acquire access to a wireless medium via a CCA procedure. The wireless communication device is further configured to transmit within an exchange of frames during a TxOP of the wireless communication device after a duration of a synchronization SIFS, where the duration of the synchronization SIFS enables alignment of an end of the exchange with a target synchronization boundary.

Another innovative aspect of the subject matter described in this disclosure can be implemented in an apparatus for wireless communication by a wireless communication device, including means for acquiring access to a wireless medium via a CCA procedure. The apparatus further includes means for transmitting within an exchange of frames during a TxOP of the wireless communication device after a duration of a synchronization SIFS, where the duration of the synchronization SIFS enables alignment of an end of the exchange with a target synchronization boundary.

Another innovative aspect of the subject matter described in this disclosure can be implemented in a computer-readable medium including stored instructions for wireless communication by a wireless communication device, executable by a processor to acquire access to a wireless medium via a CCA procedure. The instructions are further executable to transmit within an exchange of frames during a TxOP of the wireless communication device after a duration of a synchronization SIFS, where the duration of the synchronization SIFS enables alignment of an end of the exchange with a target synchronization boundary.

In some implementations, the duration of the synchronization short inter-frame space is between 13 microseconds and 19 microseconds.

In some implementations, the methods and wireless communication devices may be configured to determine the duration of the synchronization SIFS.

In some implementations of the methods and wireless communication devices, determining the duration of the synchronization short inter-frame space includes determining an offset between the target synchronization boundary and a symbol granularity of the exchange.

In some implementations, the transmission from the wireless communication device is an acknowledgment after the synchronization SIFS that extends the exchange until the target synchronization boundary. In such implementations of the methods and wireless communication devices, determining the duration of the synchronization short inter-frame space may include subtracting a duration of the acknowledgment from a time of the target synchronization boundary to determine an end of the synchronization SIF S.

In some implementations, the exchange includes an acknowledgment from another device after the transmission. In such implementations of the methods and wireless communication devices, determining the duration of the synchronization SIFS may include subtracting a duration of the transmission, a predicted duration of the acknowledgment, and a predicted duration of a SIFS from a time of the target synchronization boundary to determine an end of the synchronization SIFS.

In some implementations, the methods and wireless communication devices may be configured to adjust a number of symbols in a transmission from the wireless communication device such that a predicted end of the exchange is within one symbol length of the target synchronization boundary.

In some implementations, the methods and wireless communication devices may be configured to determine the target synchronization boundary for the exchange.

In some implementations, the target synchronization boundary is an end of a second exchange on a second link.

In some implementations, the target synchronization boundary is a coordinated universal time (UTC) schedule.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
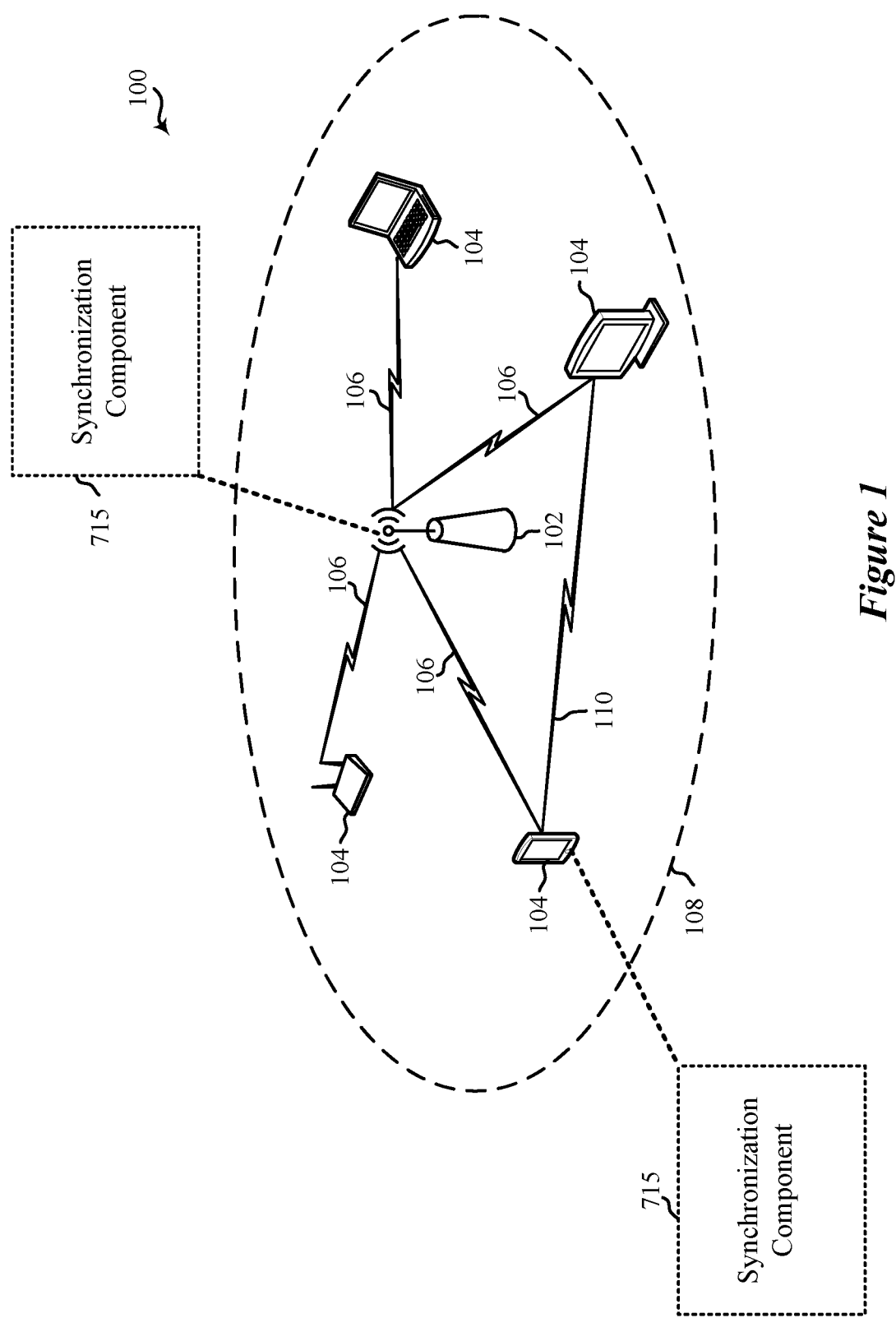
FIG. 1 shows a pictorial diagram of an example wireless communication network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

The 802.11 family of standards conventionally provides an asynchronous network. In some scenarios, synchronized access may improve performance. For example, an exposed node issue may occur when a node is within a clear channel assessment (CCA) reach of two or more nodes that are not within their respective CCA reaches. That is, the other nodes may not detect energy from each other and may repeatedly transmit. The exposed node may detect energy from the two or more nodes and wait to transmit. The repeated transmissions of the other nodes may delay or block transmissions from the exposed node. Synchronization may allow times when the exposed node is able to access the channel. Additionally, multi-link operation (MLO) may allow sending physical (PHY) protocol data units (PPDUs) on more than one link between a STA and an AP. The links may be carried on different channels, and also may be in different bands. In a synchronous PPDU transmission mode, a device (such as an AP or STA) may count down a random back off (RBO) on both links. If a first link wins the medium, both links may transmit PPDUs at the same time. Transmission at the same time may minimize in-device interference. The synchronous PPDU transmission mode may work with low-filter performance. The synchronous PPDU transmission mode may provide both latency and aggregation gains. However, in an asynchronous network, there may be no mechanism for synchronizing the multiple links, and specifically for synchronizing the end times of frame exchanges on the multiple links.

Another issue with synchronization of transmissions is variable granularity of frames and waiting periods. For example, a PPDU may have a granularity of 4 microseconds (μs) due to the symbol length. The CCA procedure and RBO may operate on a 9 μs period. Due to the different timing granularities, adjustment of a PPDU length may not be sufficient to synchronize transmissions.

Various implementations relate generally to synchronizing an end of an exchange of frames during a transmission opportunity (TXOP) with a target synchronization time using a synchronization short inter-frame space (SynSIFS) before a transmission by a wireless communication device that controls the medium. The wireless communication device obtains control of the medium for the TXOP by completing a CCA procedure. An exchange of frames during the TXOP includes transmissions from the wireless communication device (such as one or more PPDUs) and responses (such as one or more block acknowledgments (BAs)) from other devices while the wireless communication device controls the medium. A last frame of the exchange may be either a transmission from the wireless communication device or a response from another device. The end of the exchange occurs at the end of the last frame. A duration of the SynSIFS may be adjustable at μs granularity. Accordingly, the wireless communication device may select a duration of the SynSIFS that allows alignment of the end of the exchange with the target synchronization time. The wireless communication device also may adjust a number of symbols in a transmission from the wireless communication device such that a predicted end of the exchange is within one symbol length of the target synchronization boundary.

Particular implementations of the subject matter described in this disclosure can be implemented to realize one or more of the following potential advantages. In some implementations, the described techniques may be used to synchronize the end of transmissions. Accordingly, the exposed node issue may be mitigated by providing a time when all transmissions end and the exposed node is able to perform a CCA procedure at a time the medium will be idle. As another example, a device performing MLO on different links may synchronize the end of the transmissions on the different links to allow other devices to utilize multiple links.

As another example, a device operating in a synchronized fashion may synchronize the end of transmissions via a transmission schedule, such as a predefined transmission schedule. As another example, a device operating in a triggered fashion may adjust the end of transmissions to match the granted time in the trigger. As another example, a device operating in a target wake time (TWT) fashion may adjust the end of transmissions to match the duration of the allotted wake time. As another example, a device may time the end of transmissions to match the start of prioritized transmissions, such as a beacon frame or other high priority traffic. Thus, overall network throughput and efficiency may be improved.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102. In an aspect, one or more wireless communication devices such as the STAs 104 may include a synchronization component 715 as described herein. In an aspect, one or more wireless communication devices such as the AP 102 may include a synchronization component 715 as described herein.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many B9 within range of the STA or to select among multiple APs 102 that together form an extended service set (ESS) including multiple connected B9. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11av, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
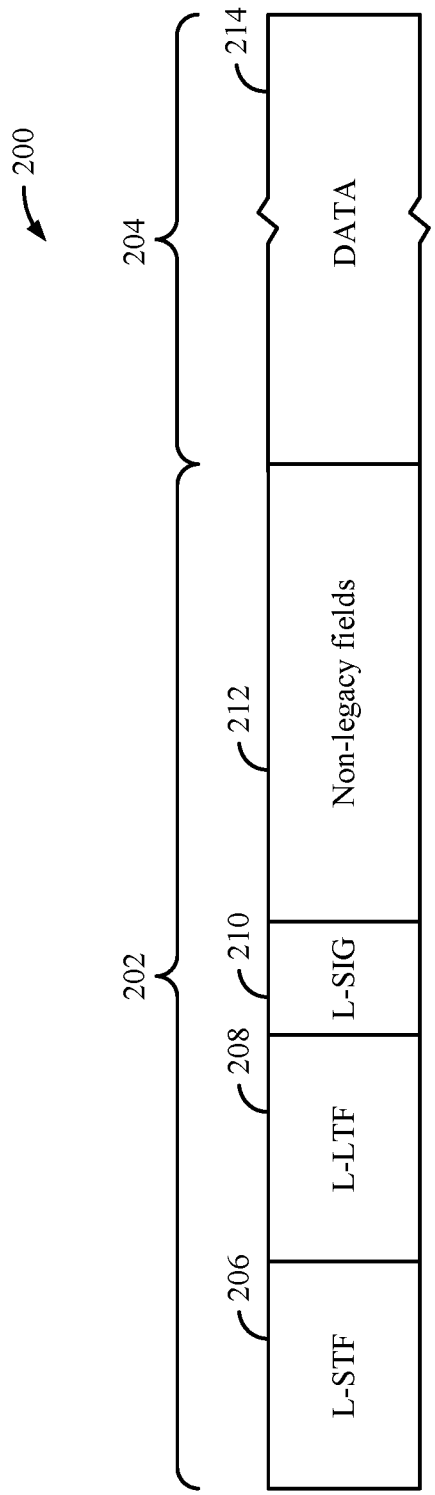
FIG. 2A shows an example physical (PHY) protocol data unit (PPDU) for communications between an access point (AP) and a number of stations (STAs).

FIG. 2A shows an example physical (PHY) protocol data unit (PPDU) 200 for wireless communication between an AP and a number of STAs. For example, the PPDU 200 can be configured as a PPDU. As shown, the PPDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 also may include a non-legacy portion including one or more non-legacy fields 212, for example, conforming to an IEEE wireless communication protocol such as the IEEE 802.11ac, 802.11ax, 802.11be or later wireless communication protocol standards.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
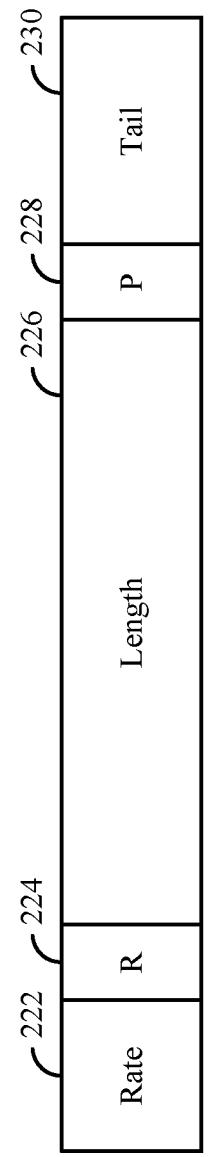
FIG. 2B shows an example legacy signal field (L-SIG) in the PPDU of FIG. 2A.

FIG. 2B shows an example L-SIG 210 in the PPDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

Figure 3A:
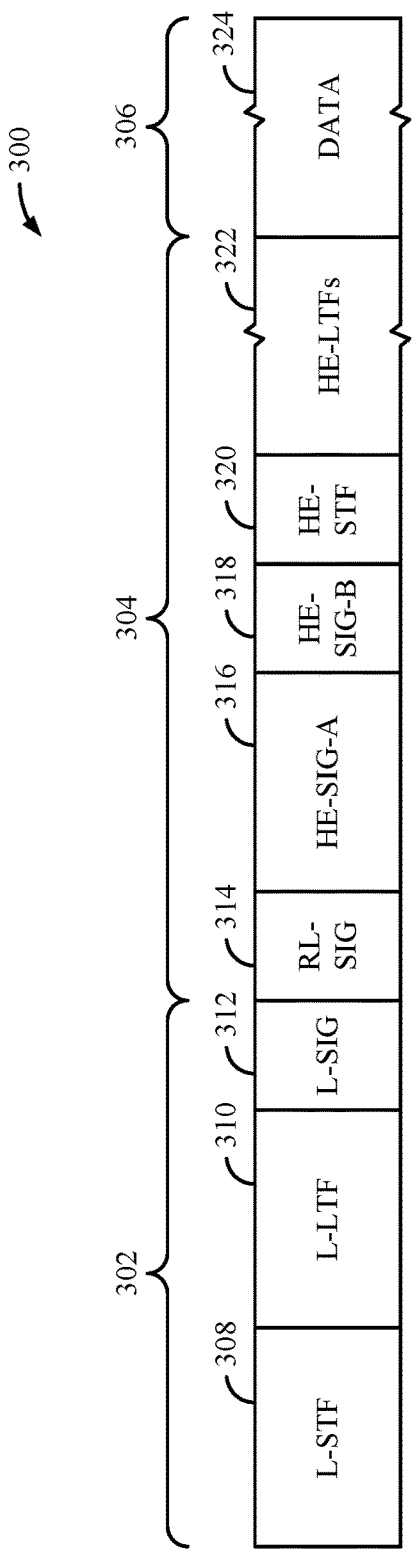
FIG. 3A shows another example PPDU for communications between an AP and a number of STAs.

FIG. 3A shows another example PPDU 300 for wireless communication between an AP and a number of STAs. The PPDU 300 may be used for MU-OFDMA or MU-MIMO transmissions. The PPDU 300 includes a PHY preamble including a legacy portion 302 and a non-legacy portion 304. The PPDU 300 may further include a PHY payload 306 after the preamble, for example, in the form of a PSDU including a DATA field 324. The legacy portion 302 of the preamble includes L-STF 308, L-LTF 310, and L-SIG 312. The non-legacy portion 304 of the preamble and the DATA field 374 may be formatted as a High Efficiency (HE) WLAN preamble and frame, respectively, in accordance with the IEEE 802.11ax amendment to the IEEE 802.11 wireless communication protocol standard. The non-legacy portion 304 includes a repeated legacy signal field (RL-SIG) 314, a first HE signal field (HE-SIG-A) 316, a second HE signal field (HE-SIG-B) 318 encoded separately from HE-SIG-A 316, an HE short training field (HE-STF) 320 and a number of HE long training fields (HE-LTFs) 322. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, HE-SIG-B 318 may be unique to each 20 MHz channel and may target specific STAs 104.

RL-SIG 314 may indicate to HE-compatible STAs 104 that the PPDU is an HE PPDU. An AP 102 may use HE-SIG-A 316 to identify and inform multiple STAs 104 that the AP has scheduled UL or DL resources for them. HE-SIG-A 316 may be decoded by each HE-compatible STA 104 served by the AP 102. HE-SIG-A 316 includes information usable by each identified STA 104 to decode an associated HE-SIG-B 318. For example, HE-SIG-A 316 may indicate the frame format, including locations and lengths of HE-SIG-Bs 318, available channel bandwidths, modulation and coding schemes (MCSs), among other possibilities. HE-SIG-A 316 also may include HE WLAN signaling information usable by STAs 104 other than the number of identified STAs 104.

HE-SIG-B 318 may carry STA-specific scheduling information such as, for example, per-user MCS values and per-user RU allocation information. In the context of DL MU-OFDMA, such information enables the respective STAs 104 to identify and decode corresponding RUs in the associated data field. Each HE-SIG-B 318 includes a common field and at least one STA-specific ("user-specific") field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other possibilities. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields (which may be followed by padding). Each user block field may include two user fields that contain information for two respective STAs to decode their respective RU payloads in DATA field 324.

Figure 3B:
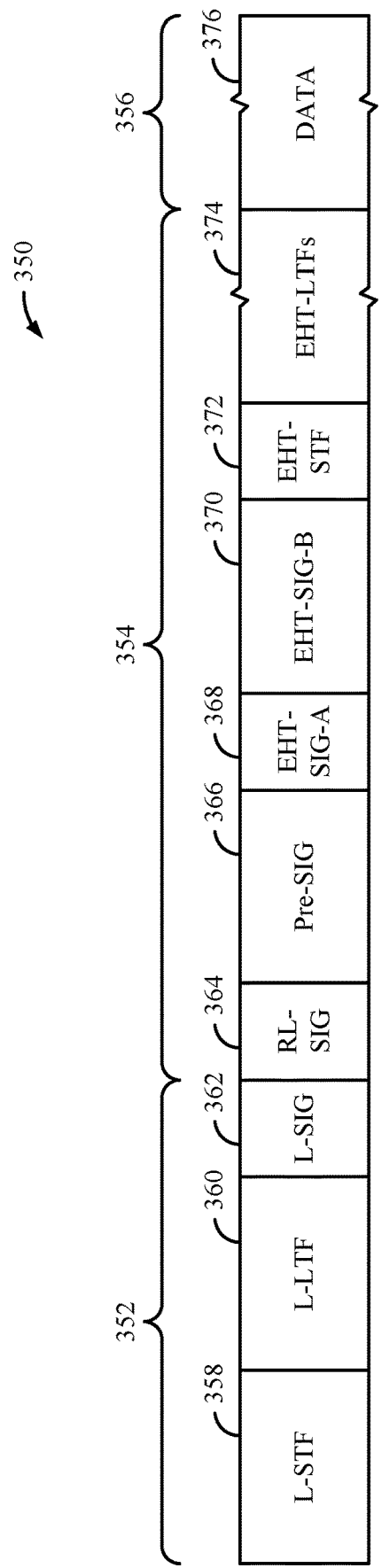
FIG. 3B shows another example PPDU for communications between an AP and a number of STAs.

FIG. 3B shows an example PPDU 350 for wireless communication between an AP and a number of STAs. The PPDU 350 may be used for SU, MU-OFDMA or MU-MIMO transmissions. The PPDU 350 includes a PHY preamble including a legacy portion 352 and a non-legacy portion 354. The PPDU 350 may further include a PHY payload 356 after the preamble, for example, in the form of a PSDU including a DATA field 376. The legacy portion 352 includes L-STF 358, L-LTF 360, and L-SIG 362. The non-legacy portion 354 of the preamble and the DATA field 376 may be formatted as an Extreme High Throughput (EHT) WLAN preamble and frame, respectively, in accordance with the IEEE 802.11be amendment to the IEEE 802.11 wireless communication protocol standard, or may be formatted as a preamble and frame, respectively, conforming to any later (post-HE) version of a new wireless communication protocol conforming to a future IEEE 802.11 wireless communication protocol standard or other standard.

The non-legacy portion 354 of the preamble includes a second signal field (referred to herein as "Pre-SIG") 366, a third signal field (referred to herein as "EHT-SIG-A" although it may be structured as, and carry version-dependent information for, other wireless communication protocol versions beyond EHT) 368, and a fourth signal field (referred to herein as "EHT-SIG-B" although it may be structured as, and carry version-dependent information for, other wireless communication protocol versions beyond EHT) 370. The non-legacy portion 354 further includes an additional short training field (referred to herein as "EHT-STF" although it may be structured as, and carry version-dependent information for, other wireless communication protocol versions beyond EHT) 372 and a number of additional long training fields (referred to herein as "EHT-LTFs" although they may be structured as, and carry version-dependent information for, other wireless communication protocol versions beyond EHT) 374. Like L-STF 358, L-LTF 360, and L-SIG 362, the information in Pre-SIG 366 and EHT-SIG-A 368 may be duplicated and transmitted in each of the component 20 MHz channels in instances involving the use of a bonded channel. In some implementations, EHT-SIG-A 368 may additionally or alternatively carry information in one or more non-primary 20 MHz channels that is different than the information carried in the primary 20 MHz channel. EHT-SIG-B 370 may be unique to each 20 MHz channel and, as described above, may target specific STAs 104. The non-legacy portion 354 of the preamble may or may not include a repeated legacy signal field (RL-SIG) 364 after L-SIG 362 and before Pre-SIG 366.

EHT-SIG-A 368 may include one or more jointly encoded symbols and may be encoded in a different block from the block in which Pre-SIG 366 is encoded. EHT-SIG-A 368 may be used by an AP to identify and inform multiple STAs 104 that the AP has scheduled UL or DL resources. EHT-SIG-A 368 may be decoded by each compatible STA 104 served by the AP 102. EHT-SIG-A 368 includes information usable by the identified STAs 104 to decode an associated EHT-SIG-B 370. EHT-SIG-A 368 may generally be used by a receiving device to interpret bits in EHT-SIG-B 370 or DATA field 376. For example, EHT-SIG-A 368 may indicate the locations and lengths of EHT-SIG-Bs 370 in the various component channels, available channel bandwidths, and modulation and coding schemes (MCSs), among other possibilities. EHT-SIG-A 368 may further include a cyclic redundancy check (CRC) (for example, four bits) and a tail (for example, 6 bits) that may be used for binary convolutional code (BCC).

EHT-SIG-B 370 may include multiple symbols that may be encoded in a different block from the block in which EHT-SIG-A 368 is encoded. In some other implementations, EHT-SIG-A 368 may be jointly encoded with some or all of EHT-SIG-B 370. For example, EHT-SIG-A 368 may be jointly encoded with a first portion of EHT-SIG-B 370 that includes information common to all users served by the PPDU 350. EHT-SIG-B 370 may carry STA-specific scheduling information such as, for example, per-user MCS values and per-user RU allocation information. EHT-SIG-B 370 may generally be used by a receiving device to interpret bits in the DATA field 376. In the context of DL MU-OFDMA, such information enables the respective STAs 104 to identify and decode corresponding RUs in the associated DATA field 376. Each EHT-SIG-B 370 includes a common field and at least one STA-specific ("user-specific") field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other possibilities. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields (which may be followed by padding). Each user block field may include, for example, two user fields that contain information for two respective STAs to decode their respective RU payloads.

Pre-SIG 366, and RL-SIG 364 if present, may indicate to EHT- or later version-compliant STAs 104 that the PPDU 350 is an EHT PPDU or a PPDU conforming to another non-legacy wireless communication protocol version. For example, Pre-SIG 366 may be used by a receiving device to interpret bits in one or more of EHT-SIG-A 368, EHT-SIG-B 370 or the DATA field 376. In some implementations, Pre-SIG 366 may include a reserved bit that indicates whether the PPDU 350 is, for example, compliant with EHT or a later version (for example, after IEEE 802.11ax) of the IEEE 802.11 family of wireless communication protocol standards or other standards. In some implementations, Pre-SIG 366 includes a version field that includes at least one bit indicating the particular wireless communication protocol version to which the PPDU 350 conforms.

Access to the shared wireless medium is generally governed by a distributed coordination function (DCF) or Enhanced Distributed Channel Access (EDCA) (generally referred to herein as DCF). With a DCF, there is generally no centralized master device allocating time and frequency resources of the shared wireless medium. On the contrary, before a wireless communication device, such as an AP 102 or a STA 104, is permitted to transmit data, it must contend for the medium, by waiting for a particular time and then accessing the wireless medium. In some implementations, the wireless communication device may be configured to implement the DCF through the use of carrier sense multiple access (CSMA) with collision avoidance (CA) (CSMA/CA) techniques and timing intervals. Before transmitting data, the wireless communication device may perform a clear channel assessment (CCA) and determine that the appropriate wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine whether the channel is busy. For example, if the received signal strength of a detected preamble is above a threshold, the medium is considered busy for the duration of the PPDU as indicated in the detected preamble. Physical carrier sensing also includes energy detection. Energy detection involves measuring the total energy the wireless communication device receives regardless of whether the received signal represents a valid frame. If the total energy detected is above a threshold, the medium is considered busy. Virtual carrier sensing is accomplished via the use of a network allocation vector (NAV), an indicator of a time when the medium may next become idle. The NAV effectively serves as a time duration that must elapse before the wireless communication device may contend for access even in the absence of a detected symbol or PPDU, or even if the detected energy is below the relevant threshold.

As described above, the DCF is implemented through the use of time intervals. These time intervals include the slot time (or "slot interval") and the inter-frame space (IFS). The slot time is the basic unit of timing and may be determined based on one or more of a transmit-receive turnaround time, a channel sensing time, a propagation delay and a MAC processing time. Measurements for channel sensing are performed for each slot. All transmissions may begin at slot boundaries. Different varieties of IFS exist including the short IFS (SIFS), the distributed IFS (DIFS), the extended IFS (EIFS), and the arbitration IFS (AIFS). For example, the DIFS may be defined as the sum of the SIFS and two times the slot time. The values for the slot time and IFS may be provided by a suitable standard specification, such as one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be).

When the NAV reaches 0, the wireless communication device performs the physical carrier sensing. If the channel remains idle for the appropriate IFS (for example, the DIFS), the wireless communication device initiates or continues a backoff timer (or random back off (RBO) timer), which represents a duration of time (in units of backoff slots) that the device must sense the medium to be idle before it is permitted to transmit. The backoff timer is decremented by one slot each time the medium is sensed to be idle during a corresponding slot interval. If the channel remains idle until the backoff timer expires (such as reaches 0), the wireless communication device becomes the holder (or "owner") of a transmit opportunity (TXOP) and may begin transmitting. The TXOP limit is the duration of time the wireless communication device can transmit frames over the channel after it has won contention for the wireless medium. If, on the other hand, one or more of the carrier sense mechanisms indicate that the channel is busy, a MAC controller within the wireless communication device will not permit transmission.

Each time the wireless communication device needs to generate a new TXOP for transmitting PPDUs, it randomly selects a new backoff timer duration. The available distribution of the numbers that may be randomly selected for the backoff timer is referred to as the contention window (CW). If, when the backoff timer expires, the wireless communication device transmits the PPDU, but no response is received (such as an acknowledgement (ACK), clear to send (CTS), block acknowledgement (BS)), there may be a collision. Additionally, if there is otherwise too much energy on the wireless channel resulting in a poor signal-to-noise ratio (SNR), the communication may be corrupted or otherwise not successfully received. In such instances, the wireless communication device may not receive a communication acknowledging the transmitted PDU within a timeout interval. The MAC may then increase the CW exponentially, for example, doubling it, and randomly select a new backoff timer duration from the new CW before each attempted retransmission of the PPDU. Before each attempted retransmission, the wireless communication device may wait a duration of DIFS and, if the medium remains idle, then proceed to initiate the new backoff timer. There are different CW and TXOP durations for each of the four access categories (ACs): voice (AC_VO), video (AC_VI), background (AC_BK), and best effort (AC_BE). This enables particular types of traffic to be prioritized in the network.

Figure 4:
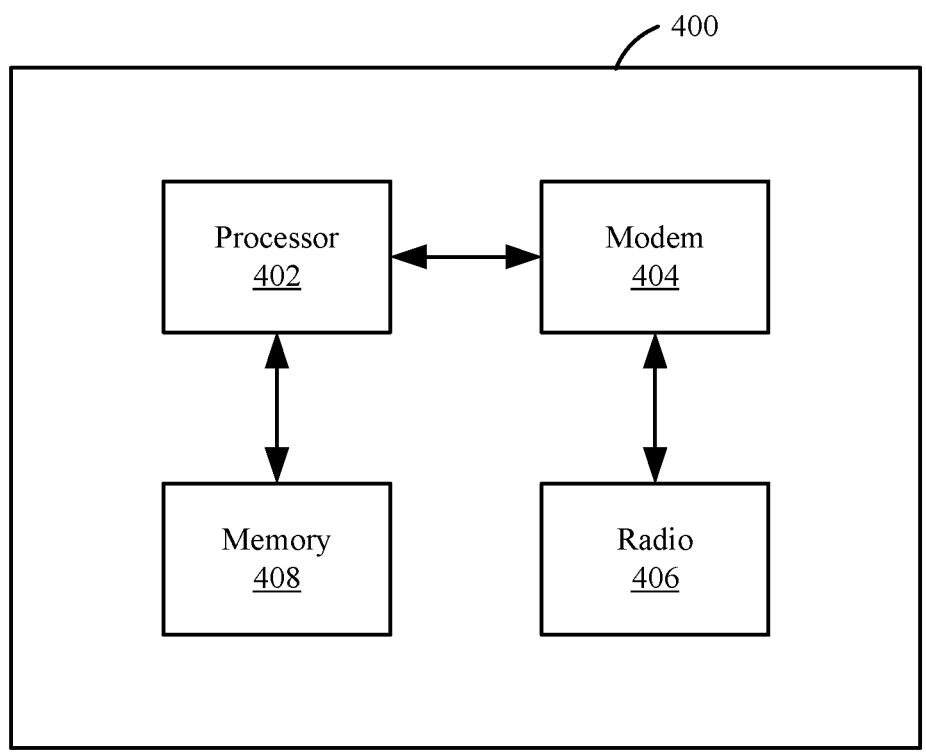
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting and receiving wireless communications in the form of, for example, wireless packets. For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ay, 802.11ax, 802.11az, 802.11ba and 802.11be, as well as further IEEE amendments.

The wireless communication device 400 can be, or can include, a chip, system on chip (SoC), chipset, package or device that includes one or more modems 404, for example, a Wi-Fi (IEEE 802.11 compliant) modem. In some implementations, the one or more modems 404 (collectively "the modem 404") additionally include a WWAN modem (for example, a 3GPP 4G LTE or 5G compliant modem). In some implementations, the wireless communication device 400 also includes one or more processors, processing blocks or processing elements 402 (collectively "the processor 402") coupled with the modem 404. In some implementations, the wireless communication device 400 additionally includes one or more radios 406 (collectively "the radio 406") coupled with the modem 404. In some implementations, the wireless communication device 400 further includes one or more memory blocks or elements 408 (collectively "the memory 408") coupled with the processor 402 or the modem 404.

The modem 404 can include an intelligent hardware block or device such as, for example, an application-specific integrated circuit (ASIC) among other possibilities. The modem 404 is generally configured to implement a PHY layer, and in some implementations, also a portion of a MAC layer (for example, a hardware portion of the MAC layer). For example, the modem 404 is configured to modulate packets and to output the modulated packets to the radio 406 for transmission over the wireless medium. The modem 404 is similarly configured to obtain modulated packets received by the radio 406 and to demodulate the packets to provide demodulated packets. In addition to a modulator and a demodulator, the modem 404 may further include digital signal processing (DSP) circuitry, automatic gain control (AGC) circuitry, a coder, a decoder, a multiplexer and a demultiplexer. For example, while in a transmission mode, data obtained from the processor 402 may be provided to an encoder, which encodes the data to provide coded bits. The coded bits may then be mapped to a number $N_{SS}$ of spatial streams for spatial multiplexing or a number $N_{STS}$ of space-time streams for space-time block coding (STBC). The coded bits in the streams may then be mapped to points in a modulation constellation (using a selected MCS) to provide modulated symbols. The modulated symbols in the respective spatial or space-time streams may be multiplexed, transformed via an inverse fast Fourier transform (IFFT) block, and subsequently provided to the DSP circuitry (for example, for Tx windowing and filtering). The digital signals may then be provided to a digital-to-analog converter (DAC). The resultant analog signals may then be provided to a frequency upconverter, and ultimately, the radio 406. In implementations involving beamforming, the modulated symbols in the respective spatial streams are precoded via a steering matrix prior to their provision to the IFFT block.

While in a reception mode, the DSP circuitry is configured to acquire a signal including modulated symbols received from the radio 406, for example, by detecting the presence of the signal and estimating the initial timing and frequency offsets. The DSP circuitry is further configured to digitally condition the signal, for example, using channel (narrowband) filtering and analog impairment conditioning (such as correcting for I/Q imbalance), and by applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with a demultiplexer that demultiplexes the modulated symbols when multiple spatial streams or space-time streams are received. The demultiplexed symbols may be provided to a demodulator, which is configured to extract the symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits may then be descrambled and provided to the MAC layer (the processor 402) for processing, evaluation or interpretation.

The radio 406 generally includes at least one radio frequency (RF) transmitter (or "transmitter chain") and at least one RF receiver (or "receiver chain"), which may be combined into one or more transceivers. For example, each of the RF transmitters and receivers may include various analog circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 404 are provided to the radio 406, which then transmits the symbols via the coupled antennas. Similarly, symbols received via the antennas are obtained by the radio 406, which then provides the symbols to the modem 404.

The processor 402 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 402 processes information received through the radio 406 and the modem 404, and processes information to be output through the modem 404 and the radio 406 for transmission through the wireless medium. For example, the processor 402 may implement a control plane and at least a portion of a MAC layer configured to perform various operations related to the generation, transmission, reception and processing of MPDUs, frames or packets. In some implementations, the MAC layer is configured to generate MPDUs for provision to the PHY layer for coding, and to receive decoded information bits from the PHY layer for processing as MPDUs. The MAC layer may further be configured to allocate time and frequency resources, for example, for OFDMA, among other operations or techniques. In some implementations, the processor 402 may generally control the modem 404 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 402, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
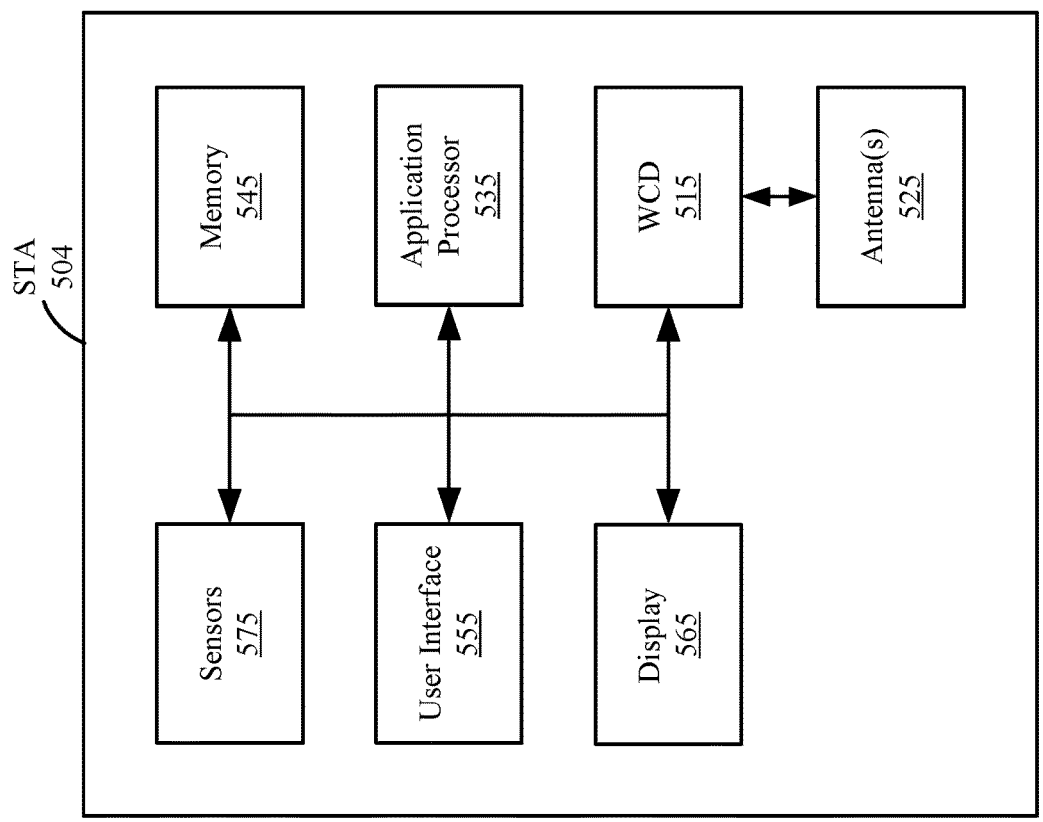
FIG. 5B shows a block diagram of an example STA.
Figure 5A:
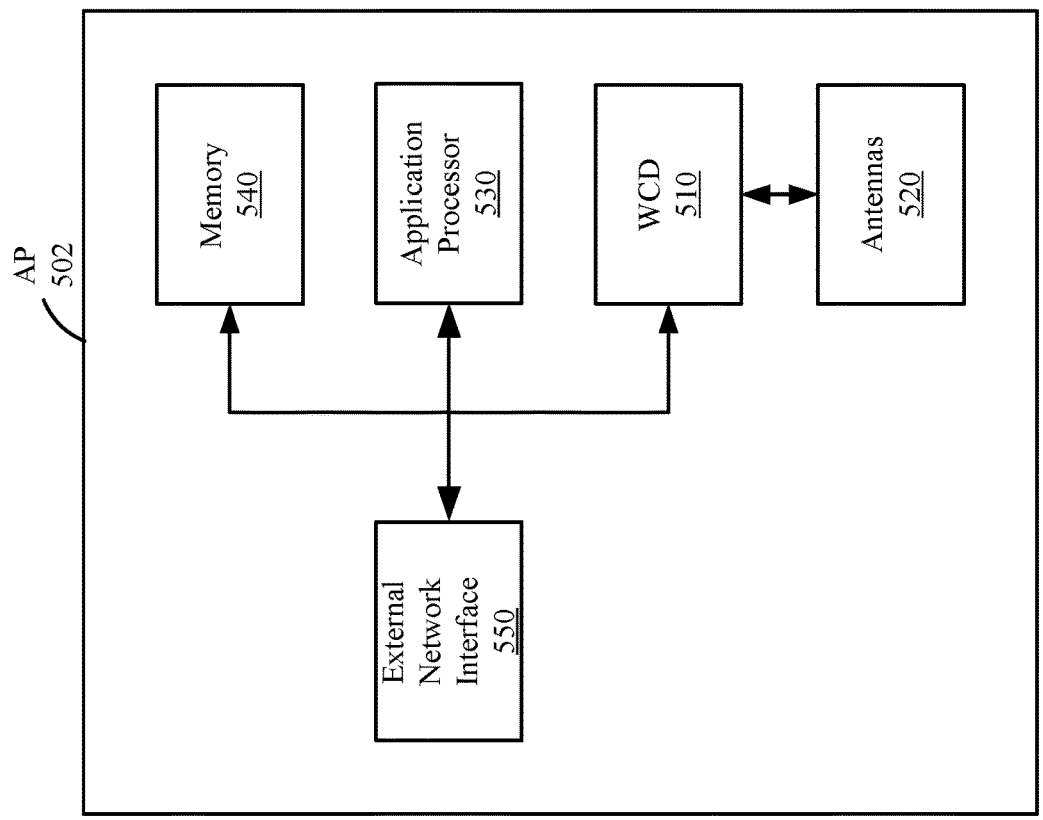
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

As described above, in a synchronous PPDU transmission mode for multi-link operation, a wireless device may count down the RBO on both links. In some cases, the wireless device may be restricted from accessing a channel of a second link at the same time that the wireless device is able to access a channel of the first link. A multi-link device (MLD) that is capable of simultaneous transmission and reception on multiple links for a given set of links may be referred to as a simultaneous transmission and reception (STR) device. For example, an MLD with a standard filter or an enhanced filter may simultaneously transmit on a 2.4 GHz band and receive on a 5 GHz band and be considered an STR device for those links. An MLD that is not capable of simultaneous transmission and reception on multiple links for a given set of links may be referred to as a non-STR (NSTR) device. For example, an MLD with a standard filter may not be able to simultaneously transmit on a 5 GHz band and receive on a 6 GHz band and may be considered an NSTR device for that those links. In contrast, if the MLD has a robust (enhanced) RF filter, such as a higher-order filter, which may be true for an AP, the MLD may be able to simultaneously transmit on a 5 GHz band and receive on a 6 GHz band and may be considered a STR device for those links.

Figure 6:
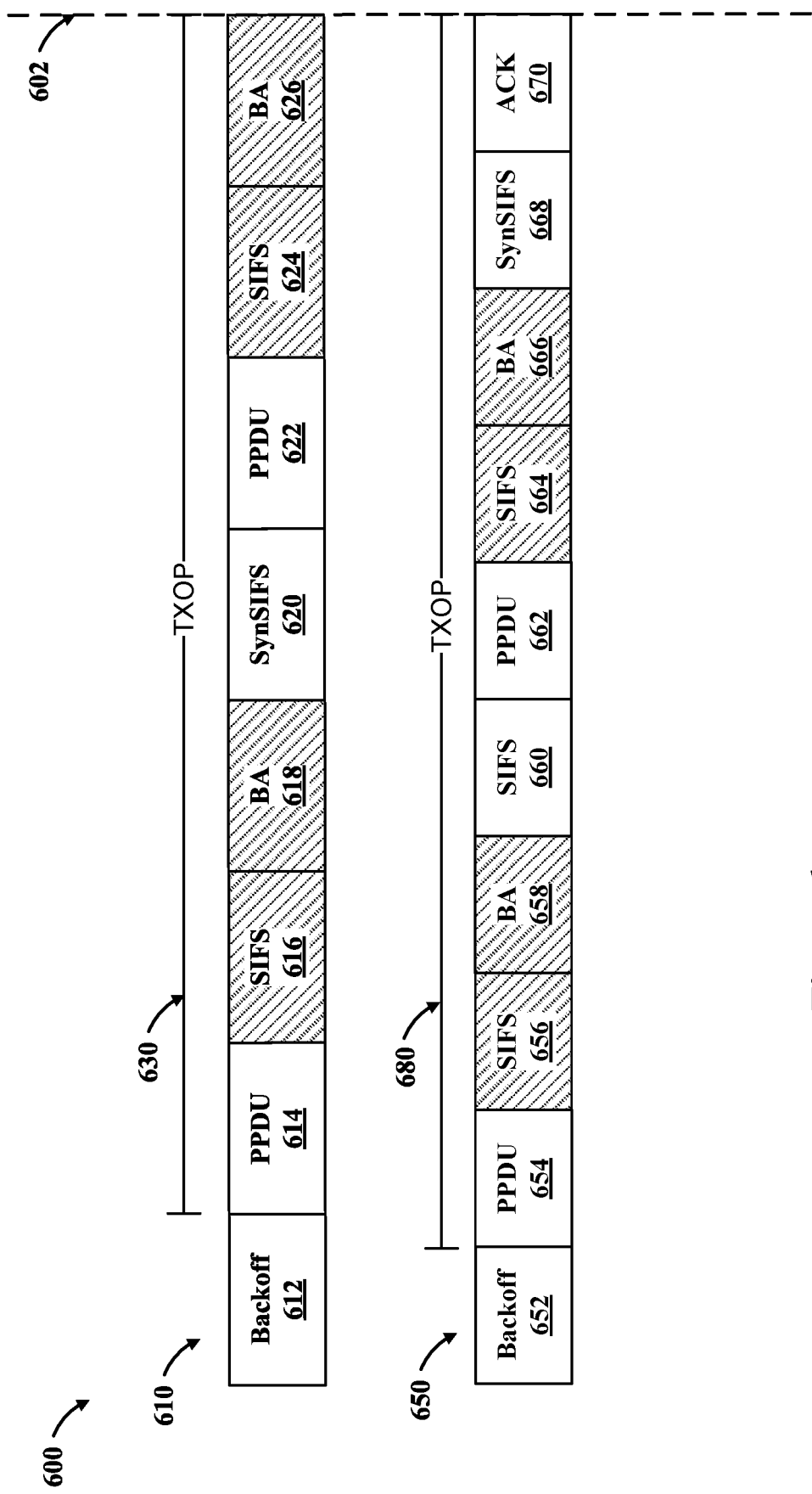
FIG. 6 shows examples of synchronized exchanges involving a wireless communication device.

FIG. 6 shows examples 600 of synchronized exchanges involving a wireless communication device 700 (depicted and described with respect to FIG. 7), which may either be an AP 502 or a STA 504. The wireless communication device 700 may be configured to perform a CCA procedure by counting down an RBO. The wireless communication device 700 may obtain a TXOP in which the wireless communication device transmits one or more PPDUs. Another device participating in the exchange may transmit a block acknowledgment (BA) for the PPDU, indicating that the PPDU has been received. Time periods controlled by the wireless communication device 700 are shown without hatching, while time periods controlled by the other device are shown with hatching.

A target synchronization boundary 602 may be defined as an end time for one or more transmissions to provide synchronization of the transmissions. For example, the target synchronization boundary 602 may be a UTC time defined by a standard or regulation. For instance, a periodic target synchronization boundary 602 (for example, every 1-12 milliseconds (ms)) may be established to provide periodic synchronization. In another example, the wireless communication device 700 may transmit on multiple links and the target synchronization boundary 602 may be an end of an exchange on one link. For instance, the wireless communication device 700 may control an exchange 650 on a second link to synchronize with an end of the exchange 610 on a first link.

In the first exchange 610, the wireless communication device 700 may perform a backoff 612 to obtain the TXOP. The backoff 612 may have a granularity of 9 μs and the backoff 612 may end when the RBO counts down to 0. Accordingly, a TXOP 630 may start at an end of the backoff 612 and a relationship between the start of the TXOP 630 and the target synchronization boundary 602 may depend on the backoff 612. The wireless communication device 700 may transmit the PPDU 614 during the TXOP 630. A length of the PPDU 614 may be adjusted by the wireless communication device 700, for example, by padding the PPDU 614 with additional symbols. The length of the PPDU 614 may have a granularity of 4 μs due to the duration of a symbol. The other device that receives the PPDU 614 may wait for a short inter-frame space (SIFS) 616 before transmitting a block acknowledgment (BA) 618. The wireless communication device 700 may not be able to control a length of the SIFS 616 and the BA 618.

After the BA 618, the wireless communication device 700 may wait for a SIFS before transmitting a second PPDU 622. The wireless communication device 700 also may expect the other device to wait for a second SIFS 624 and transmit a second BA 626. A duration of the second SIFS 624 may generally be fixed to 16 μs. A duration of the BA 626 may be predicted based on the second PPDU. Accordingly, the wireless communication device 700 may be able to determine a duration of the SynSIFS 620 that will align an end of the exchange 610 with the target synchronization boundary 602. The wireless communication device 700 may adjust a number of symbols in the PPDU 622 such that a predicted end of the exchange 610 is within one symbol length of the target synchronization boundary 602. The wireless communication device 700 may select a duration of the SynSIFS 620 in a range of 13 µs to 19 µs based on the determined duration of the PPDU 622 and the predicted duration of the SIFS 624 and BA 626. In some implementations, a SynSIFS longer than 16 µs may be selected, up to a limit of about 25 µs, at which point the control of the medium is lost and a new backoff (RBO) must be started. In some implementations, a SynSIFS shorter than 16 µs may not cause any issues with respect to control over the medium, in the sense that control over the medium is retained. However, a shorter SynSIFS duration may cause issues at the other device. Therefore, in some implementations, a reduced duration SynSIFS may be introduced between two subsequent transmissions by the same device such that no action by the other device is affected by the reduced duration SynSIFS. Accordingly, the wireless communication device 700 may use the SynSIFS 620 to align the end of the exchange 610 with the target synchronization boundary 602.

As another example, the wireless communication device 700 may perform the exchange 650. For instance, the exchange 650 may be on a second link, and the wireless communication device 700 may determine the target synchronization boundary 602 at the end of the exchange 610 such that the end of the first exchange 610 and the end of the second exchange 650 are aligned. Alternatively, the second exchange 650 may be independent of the first exchange 610.

In the second exchange 650, the wireless communication device 700 may perform a backoff 652 to obtain the TXOP. Similar to the backoff 612, the backoff 652 may have a granularity of 9 µs and the backoff 612 may end when the corresponding RBO counts down to 0. In MLO, the RBO for the first link and the RBO for the second link may be independent, so the TXOP 680 may begin at a different time than the TXOP 630. Accordingly, the TXOP 680 may start at an end of the backoff 652 and a relationship between the start of the TXOP 680 and the target synchronization boundary 602 may depend on the backoff 652. The wireless communication device 700 may transmit the PPDU 654 during the TXOP 680. A length of the PPDU 654 may be adjusted by the wireless communication device 700, for example, by padding the PPDU 654 with additional symbols. The length of the PPDU 614 may have a granularity of 4 µs due to the symbol length. The other device that receives the PPDU 654 may wait for a SIFS 656 before transmitting a BA 658. The wireless communication device 700 may not be able to control a length of the SIFS 656 and the BA 658. The wireless communication device 700 may wait for a SIFS 660 before transmitting a second PPDU 662. The other device may respond with a second BA 666 after waiting for a SIFS 664.

Due to a combination of the length and number of the PPDUs 654, 662, the transmissions of the wireless communication device 700 may end before the target synchronization boundary 602. For synchronization, the wireless communication device 700 may extend the exchange 650 by transmitting an ACK 670. The ACK 670 may not acknowledge a specific transmission, but may be used as a short transmission to maintain control of the medium until the target synchronization boundary 602. Like the PPDU 654, the duration of the ACK 670 may have symbol-level granularity of 4 µs. The wireless communication device 700 may determine a duration of the SynSIFS 668 that will align an end of the exchange 610 with the target synchronization boundary 602. For instance, the wireless communication device 700 may subtract a duration of the ACK 670 from the time of the target synchronization boundary 602 to determine the end of the SynSIFS 668. Accordingly, the wireless communication device 700 may use the SynSIFS 668 to align the end of the exchange 650 with the target synchronization boundary 602.

In some implementations, any SIFS for the wireless communication device 700 may be used as a SynSIFS to adjust timing. For example, in some implementations, after the backoff 612, 652, the wireless communication device 700 may assume that waiting times and frames in the rest of the exchange will have a granularity of 4 µs, so the wireless communication device 700 may include a SynSIFS early in the frame such that a time to the target synchronization boundary 602 is a multiple of 4 µs. In some other implementations, a last SIFS of the exchange 610, 650 may be a SynSIFS to compensate for any changes in timing due to previous frames.

Figure 7:
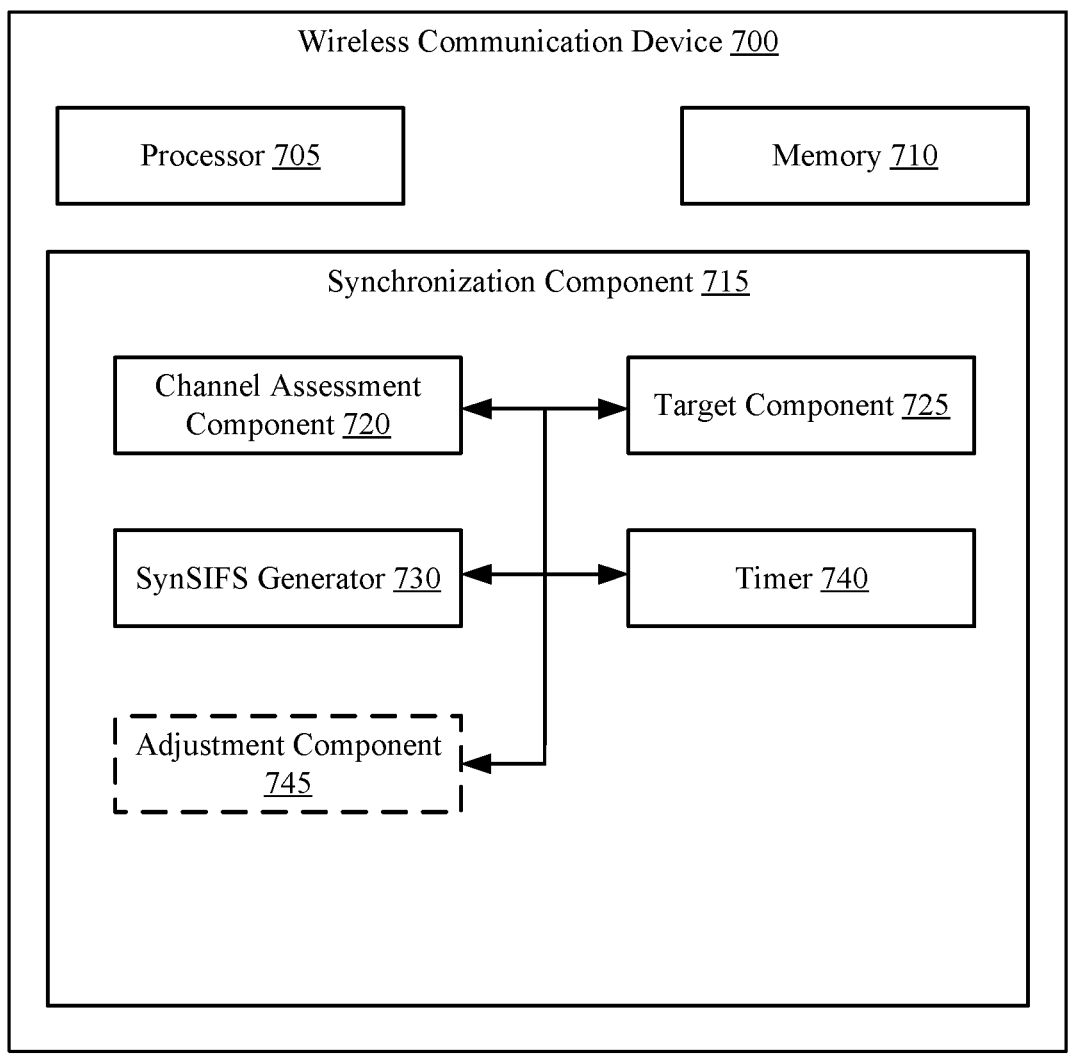
FIG. 7 shows a block diagram of an example wireless communication device.

FIG. 7 shows a block diagram of an example wireless communication device 700. In some implementations, the wireless communication device 700 is configured to perform the process 800 described with reference to FIG. 8. The wireless communication device 700 may be an example implementation of the wireless communication device 400 described with reference to FIG. 4. For example, the wireless communication device 700 can be a chip, SoC, chipset, package or device that includes at least one processor and at least one modem (for example, a Wi-Fi (IEEE 802.11) modem, or a cellular modem). In some implementations, the wireless communication device 700 can be a device for use in a STA, such as one of the STAs 104 and 504 described with reference to FIGS. 1 and 5B, respectively. In some other implementations, the wireless communication device 700 can be a STA that includes such a chip, SoC, chipset, package or device as well as at least one transmitter, at least one receiver, and at least one antenna. In some implementations, the wireless communication device 700 can be a device for use in an AP, such as one of the APs 102 and 502 described with reference to FIGS. 1 and 5A, respectively. In some other implementations, the wireless communication device 700 can be an AP that includes such a chip, SoC, chipset, package or device as well as at least one transmitter, at least one receiver, and at least one antenna.

The wireless communication device 700 includes an apparatus for wireless communication, such as a processor 705, and a memory 710. The wireless communication device 700 may include a synchronization component 715, which may include a channel assessment component 720, a target component 725, a SynSIFS generator 730, a timer 740, and an optional adjustment component 745. Portions of one or more of the components 715, 720, 725, 730, 740, and 745 may be implemented at least in part in hardware or firmware. For example, the synchronization component 715 may be implemented at least in part by a modem (such as the modem 404). In some implementations, at least some of the components 715, 720, 725, 730, 740, and 745 are implemented at least in part as software stored in a memory (such as the memory 408 or the memory 710). For example, portions of one or more of the components 715, 720, 725, 730, 740, and 745 can be implemented as non-transitory instructions (or "code") executable by a processor (such as the processor 402 or processor 705) to perform the functions or operations of the respective component.

The synchronization component 715 is configured to align an end of one or more exchanges 610, 650 with a target synchronization boundary 602.

The channel assessment component 720 is configured to perform a CCA procedure and acquire access to the wireless medium.

The target component 725 is configured to determine the target synchronization boundary 602 for the exchange 610 or 650 during a transmission opportunity 630 or 680 of the wireless communication device 700. For example, the target synchronization boundary may be an end of a second exchange on a second link. In another example, the target synchronization boundary is a coordinated universal time (UTC) schedule.

The SynSIFS generator 730 is configured to determine a duration of a SynSIFS 620 or 668 that will align an end of the exchange 610 or 650 with the target synchronization boundary 602. In some implementations, the duration of the SynSIFS 620 or 668 is between 13 μs and 19 μs. In some implementations, the SynSIFS generator 730 may determine an offset between the target synchronization boundary and a symbol granularity of the exchange. In some implementations, the offset may be a difference between a multiple of the symbol granularity and the target synchronization boundary. For instance, the offset may be a time that the exchange will extend past the target synchronization boundary if a standard SIFS were used and the transmission were padded with additional symbols to extend the exchange past the target synchronization boundary. In some implementations, the range of the SynSIFS duration may be 3 μs to adjust within the granularity of a symbol. For example, the duration may be between 13 μs and 16 μs or between 16 μs and 19 μs. Other possible ranges include 14 μs to 17 μs and 15 μs to 18 μs. In some implementations, the SynSIFS may depend on the symbol duration. For example, the duration of the SynSIFS may be a multiple of the symbol duration minus the offset. For instance, where the symbol duration is 4 μs, the duration of the SynSIFS may be 4 symbols (16 μs) minus an offset having a value between 0 μs and 3 μs. In some implementations, the SynSIFS also may be used to correct timing errors introduced by incorrect intermediate SIFS intervals.

The timer 740 is configured to wait for the duration of the SynSIFS 620 or 668 prior to a transmission (such as PPDU 622 or 6ACK 70) from the wireless communication device 700 during the exchange 610 or 650.

The adjustment component 745 is configured to adjust a number of symbols in a transmission (such as PPDU 622 or ACK 670) from the wireless communication device 700 such that a predicted end of the exchange 610 or 650 is within one symbol length of the target synchronization boundary 602.

Figure 8:
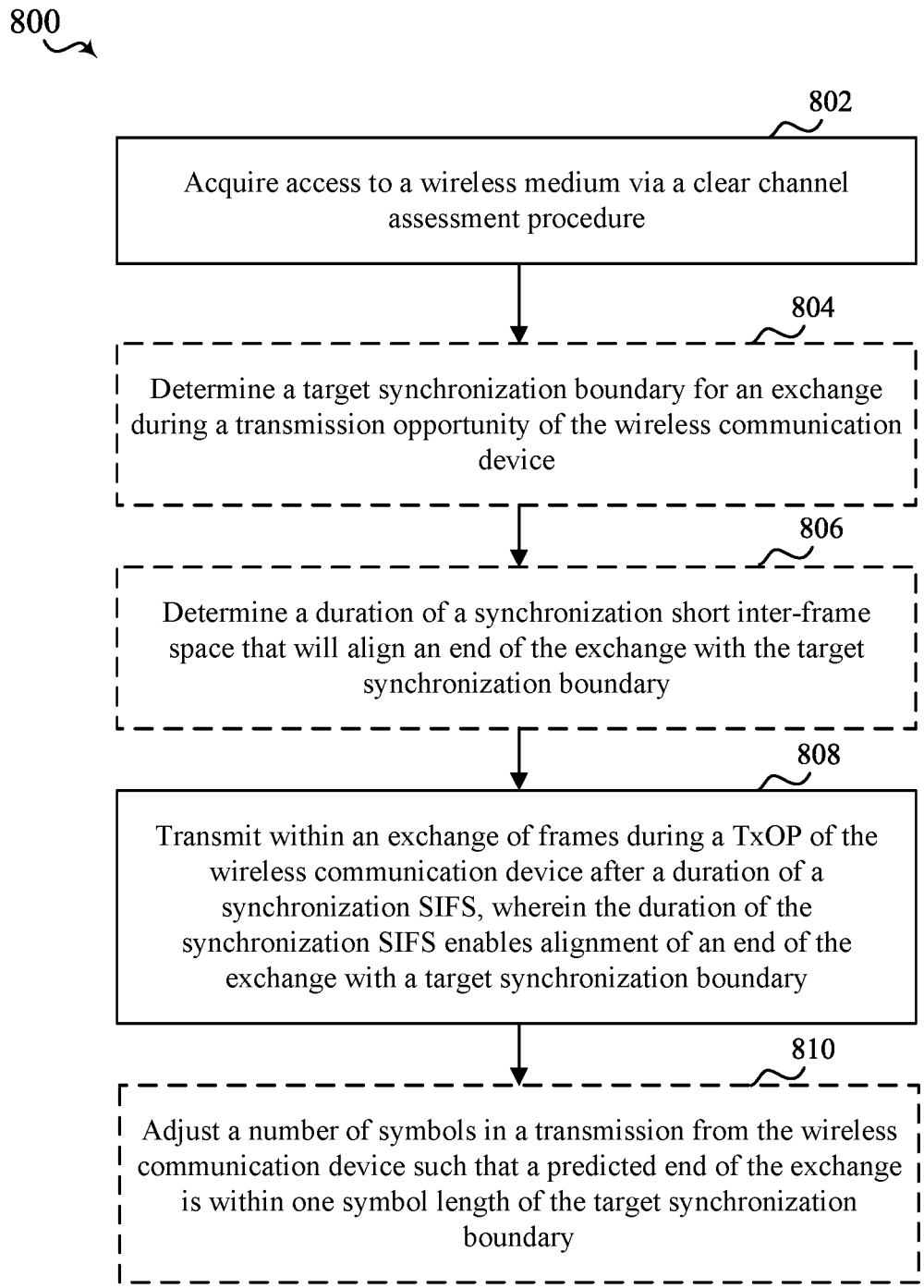
FIG. 8 shows a flowchart illustrating an example process for synchronizing an end of an exchange with a target synchronization boundary.

FIG. 8 shows a flowchart illustrating an example process 800 for synchronizing an end of an exchange with a target synchronization boundary. The process 800 may be performed by a wireless communication device such as the wireless communication device 400 described with reference to FIG. 4. In some implementations, the process 800 may be performed by a wireless communication device operating as or within a STA, such as one of the STAs 104 and 504 described with reference to FIGS. 1 and 5B, respectively. In some implementations, the process 800 may be performed by a wireless communication device operating as or within an AP, such as one of the APs 102 and 502 described with reference to FIGS. 1 and 5A, respectively.

In block 802, the process 800 includes acquiring access to a wireless medium via a clear channel assessment procedure. For example, in an aspect, wireless communication device 700, processor 705, memory 710, synchronization component 715, or channel assessment component 720 may be configured to or may include means for acquiring access to a wireless medium via a clear channel assessment procedure. For example, the channel assessment component 720 may count down (for example, decrement) a RBO each time a wireless medium such as a channel is unoccupied in a slot. The channel assessment component 720 may determine that the RBO has counted down to zero when a value of the RBO reaches zero. The channel assessment component 720 may then acquire access to the channel.

In block 804, the process 800 optionally includes determining a target synchronization boundary for an exchange during a transmission opportunity of the wireless communication device. For example, in an aspect, wireless communication device 700, processor 705, memory 710, synchronization component 715, or target component 725 may be configured to or may include means for determining a target synchronization boundary for an exchange during a transmission opportunity of the wireless communication device. For example, the target component 725 may determine an end of a second exchange on a second link. As another example, the target component 725 may determine a UTC schedule.

In block 806, the process 800 optionally includes determining a duration of a synchronization short inter-frame space that will align an end of the exchange with the target synchronization boundary. For example, in an aspect, wireless communication device 700, processor 705, memory 710, synchronization component 715, or SynSIFS generator 730 may be configured to or may include means determining a duration of a synchronization short inter-frame space that will align an end of the exchange with the target synchronization boundary. In some implementations, the SynSIFS generator 730 may determine an offset between the target synchronization boundary and a symbol granularity of the exchange. In some implementations, the SynSIFS generator 730 may determine the duration of the SynSIFS to be between 13 microseconds and 19 microseconds. In some implementations, the transmission from the wireless communication device is an acknowledgment (such as ACK 670) after the synchronization SIFS 668 that extends the exchange 650 until the target synchronization boundary 602. In such implementations, the SynSIFS generator 730 may subtract a duration of the acknowledgment from a time of the target synchronization boundary to determine an end of the synchronization SIFS. In some implementations, where the exchange 610 includes an acknowledgment (such as BA 626) from another device after the transmission (such as PPDU 622), the SynSIFS generator 730 may subtract a duration of the transmission, a predicted duration of the acknowledgment, and a predicted duration of a SIFS (such as SIFS 624) from a time of the target synchronization boundary to determine an end of the synchronization SIFS.

In block 808, the process 800 includes transmitting within an exchange of frames during a TxOP of the wireless communication device after a duration of a synchronization SIFS. The duration of the synchronization SIFS enables alignment of an end of the exchange with a target synchronization boundary. For example, in an aspect, wireless communication device 700, processor 705, memory 710, synchronization component 715, or timer 740 may be configured to or may include means for transmitting within an exchange of frames during a TxOP of the wireless communication device after a duration of a synchronization SIFS. In some implementations, the wireless communication device 700 may wait for the duration of the synchronization SIFS prior to the transmission from the wireless communication device during the exchange.

In block 810, the process 800 optionally includes adjusting a number of symbols in a transmission from the wireless communication device such that a predicted end of the exchange is within one symbol length of the target synchronization boundary. For example, in an aspect, wireless communication device 700, processor 705, memory 710, synchronization component 715, or adjustment component 745 may be configured to or may include means for adjusting a number of symbols in a transmission from the wireless communication device such that a predicted end of the exchange is within one symbol length of the target synchronization boundary.

SOME FURTHER EXAMPLE CLAUSES

Implementation examples are described in the following numbered clauses:

1. A method for wireless communication by an apparatus of a wireless communication device, including:
   acquiring access to a wireless medium via a clear channel assessment (CCA) procedure; and
   transmitting within an exchange of frames during a transmission opportunity (TxOP) of the wireless communication device after a duration of a synchronization short inter-frame space (SIFS), where the duration of the synchronization SIFS enables alignment of an end of the exchange with a target synchronization boundary.

2. The method of clause 1, where the duration of the synchronization SIFS is between 13 microseconds and 19 microseconds.

3. The method of clause 1 or 2, further including determining the duration of the synchronization SIFS.

4. The method of clause 3, where determining the duration of the synchronization SIFS includes determining an offset between the target synchronization boundary and a symbol granularity of the exchange.

5. The method of clause 3, where the transmission from the wireless communication device is an acknowledgment after the synchronization SIFS that extends the exchange until the target synchronization boundary.

6. The method of clause 5, where determining the duration of the synchronization SIFS includes subtracting a duration of the acknowledgment from a time of the target synchronization boundary to determine an end of the synchronization SIFS.

7. The method of clause 3, where the exchange includes an acknowledgment from another device after the transmission, and where determining the duration of the synchronization SIFS includes subtracting a duration of the transmission, a predicted duration of the acknowledgment, and a predicted duration of a SIFS from a time of the target synchronization boundary to determine an end of the synchronization SIFS.

8. The method of any of clauses 1-7, further including adjusting a number of symbols in the transmission from the wireless communication device such that a predicted end of the exchange is within one symbol length of the target synchronization boundary.

9. The method of any of clauses 1-8, further including determining the target synchronization boundary for the exchange.

10. The method of any of clauses 1-9, where the target synchronization boundary is an end of a second exchange on a second link.

11. The method of any of clauses 1-9, where the target synchronization boundary is a coordinated universal time (UTC) schedule.

12. A wireless communication device, including:
   at least one modem;
   at least one processor communicatively coupled with the at least one modem; and
   at least one memory communicatively coupled with the at least one processor and storing processor-readable code that, when executed by the at least one processor in conjunction with the at least one modem, is configured to:
      acquire access to a wireless medium via a clear channel assessment (CCA) procedure; and
      transmit within an exchange of frames during a transmission opportunity (TxOP) of the wireless communication device after a duration of a synchronization short inter-frame space (SIFS), where the duration of the synchronization SIFS enables alignment of an end of the exchange with a target synchronization boundary.

13. The wireless communication device of clause 12, where the duration of the synchronization SIFS is between 13 microseconds and 19 microseconds.

14. The wireless communication device of clause 12 or 13, where the at least one processor is configured to determine the duration of the synchronization SIFS.

15. The wireless communication device of clause 14, where the at least one processor is configured to determine an offset between the target synchronization boundary and a symbol granularity of the exchange.

16. The wireless communication device of clause 14, where the transmission from the wireless communication device is an acknowledgment after the synchronization SIFS that extends the exchange until the target synchronization boundary.

17. The wireless communication device of clause 16, where the at least one processor is configured to determine subtract a duration of the acknowledgment from a time of the target synchronization boundary to determine an end of the synchronization SIF S.

18. The wireless communication device of clause 14, where the exchange includes an acknowledgment from another device after the transmission, and where the at least one processor is configured to subtract a duration of the transmission, a predicted duration of the acknowledgment, and a predicted duration of a SIFS from a time of the target synchronization boundary to determine an end of the synchronization SIFS.

19. The wireless communication device of any of clauses 12-18, where the at least one processor is configured to adjust a number of symbols in the transmission from the wireless communication device such that a predicted end of the exchange is within one symbol length of the target synchronization boundary.

20. The wireless communication device of any of clauses 12-19, where the at least one processor is configured to determine the target synchronization boundary for the exchange.

21. The wireless communication device of any of clauses 12-19, where the target synchronization boundary is an end of a second exchange on a second link.

22. The wireless communication device of any of clauses 12-19, where the target synchronization boundary is a coordinated universal time (UTC) schedule.

23. An apparatus for wireless communication by a wireless communication device, including:
   means for acquiring access to a wireless medium via a clear channel assessment (CCA) procedure; and
   means for transmitting within an exchange of frames during a transmission opportunity (TxOP) of the wireless communication device after a duration of a synchronization short inter-frame space (SIFS), where the duration of the synchronization SIFS enables alignment of an end of the exchange with a target synchronization boundary.

24. The apparatus of clause 23, where the duration of the synchronization SIFS is between 13 microseconds and 19 microseconds.

25. The apparatus of clause 23 or 24, further including means for determining the duration of the synchronization SIFS.

26. The apparatus of clause 25, where the means for determining the duration of the synchronization SIFS is configured to determine an offset between the target synchronization boundary and a symbol granularity of the exchange.

27. The apparatus of clause 25, where the transmission from the wireless communication device is an acknowledgment after the synchronization SIFS that extends the exchange until the target synchronization boundary.

28. The apparatus of clause 27, where the means for determining the duration of the synchronization SIFS is configured to subtract a duration of the acknowledgment from a time of the target synchronization boundary to determine an end of the synchronization SIFS.

29. The apparatus of clause 25, where the exchange includes an acknowledgment from another device after the transmission, and where the means for determining the duration of the synchronization SIFS is configured to subtract a duration of the transmission, a predicted duration of the acknowledgment, and a predicted duration of a SIFS from a time of the target synchronization boundary to determine an end of the synchronization SIFS.

30. The apparatus of any of clauses 23-29, further including means for adjusting a number of symbols in the transmission from the wireless communication device such that a predicted end of the exchange is within one symbol length of the target synchronization boundary.

31. The apparatus of any of clauses 23-30, further including means for determining the target synchronization boundary for the exchange.

32. The apparatus any of clauses 23-31, where the target synchronization boundary is an end of a second exchange on a second link.

33. The apparatus of any of clauses 23-31, where the target synchronization boundary is a coordinated universal time (UTC) schedule.

34. A non-transitory computer-readable medium including stored instructions for wireless communication by a wireless communication device, executable by a processor to:
acquire access to a wireless medium via a clear channel assessment (CCA) procedure; and
transmit within an exchange of frames during a transmission opportunity (TxOP) of the wireless communication device after a duration of a synchronization short inter-frame space (SIFS), where the duration of the synchronization SIFS enables alignment of an end of the exchange with a target synchronization boundary.

35. The non-transitory computer-readable medium of clause 34, where the duration of the synchronization SIFS is between 13 microseconds and 19 microseconds.

36. The non-transitory computer-readable medium of clause 34 or 35, further including code to determine the duration of the synchronization SIFS.

37. The non-transitory computer-readable medium of clause 36, where the code to determine the duration of the synchronization SIFS includes code to determine an offset between the target synchronization boundary and a symbol granularity of the exchange.

38. The non-transitory computer-readable medium of clause 36, where the transmission from the wireless communication device is an acknowledgment after the synchronization SIFS that extends the exchange until the target synchronization boundary.

39. The non-transitory computer-readable medium of clause 38, where the code to determine the duration of the synchronization SIFS includes code to subtract a duration of the acknowledgment from a time of the target synchronization boundary to determine an end of the synchronization SIFS.

40. The non-transitory computer-readable medium of clause 36, where the exchange includes an acknowledgment from another device after the transmission, and where the code to determine the duration of the synchronization SIFS includes code to subtract a duration of the transmission, a predicted duration of the acknowledgment, and a predicted duration of a SIFS from a time of the target synchronization boundary to determine an end of the synchronization SIFS.

41. The non-transitory computer-readable medium of any of clauses 34-40, further including code to adjust a number of symbols in the transmission from the wireless communication device such that a predicted end of the exchange is within one symbol length of the target synchronization boundary.

42. The non-transitory computer-readable medium of any of clauses 34-41, further including code to determine the target synchronization boundary for the exchange.

43. The non-transitory computer-readable medium of any of clauses 34-42, where the target synchronization boundary is an end of a second exchange on a second link.

44. The non-transitory computer-readable medium of any of clauses 34-42, where the target synchronization boundary is a coordinated universal time (UTC) schedule.

45. A method for wireless communication by an apparatus of a wireless communication device, including:
acquiring access to a wireless medium via a clear channel assessment (CCA) procedure;
determining a target synchronization boundary for an exchange during a transmission opportunity (TxOP) of the wireless communication device;
determining a duration of a synchronization short inter-frame space (SIFS) that will align an end of the exchange with the target synchronization boundary; and
waiting for the duration of the synchronization short inter-frame space prior to a transmission from the wireless communication device during the exchange.

46. The method of clause 45, where the duration of the synchronization short inter-frame space is between 13 microseconds and 19 microseconds.

47. The method of clause 45 or 46, where determining the duration of the synchronization short inter-frame space includes determining an offset between the target synchronization boundary and a symbol granularity of the exchange.

48. The method of any of clauses 45-47, further including adjusting a number of symbols in the transmission from the wireless communication device such that a predicted end of the exchange is within one symbol length of the target synchronization boundary.

49. The method of any of clauses 45-48, where the target synchronization boundary is an end of a second exchange on a second link.

50. The method of any of clauses 45-48, where the target synchronization boundary is a coordinated universal time (UTC) schedule.

51. An apparatus for wireless communication, including: a memory storing computer-executable instructions; and at least one processor coupled to the memory and configured to execute the computer-executable instructions to perform the method of any of clauses 45-50.

52. An apparatus for wireless communication, including: means for performing the method of any of clauses 45-50.

53. A non-transitory computer-readable medium storing computer executable code, the code when executed by a processor causes the processor to perform the method of any of clauses 45-50.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by an apparatus of a wireless communication device, comprising:
    acquiring access to a wireless medium via a clear channel assessment (CCA) procedure; and
    transmitting, to another device, a frame within an exchange of frames during a transmission opportunity (TxOP) of the wireless communication device after a duration of a synchronization short inter-frame space (SIFS), wherein the duration of the synchronization SIFS enables alignment of an end of the exchange with a target synchronization boundary.

2. The method of claim 1, wherein the duration of the synchronization SIFS is between 13 microseconds and 19 microseconds.

3. The method of claim 1, further including determining the duration of the synchronization SIFS.

4. The method of claim 3, wherein determining the duration of the synchronization SIFS includes determining an offset between the target synchronization boundary and a symbol granularity of the exchange.

5. The method of claim 3, wherein the frame from the wireless communication device is an acknowledgment after the synchronization SIFS that extends the exchange until the target synchronization boundary.

6. The method of claim 5, wherein determining the duration of the synchronization SIFS includes subtracting a duration of the acknowledgment from a time of the target synchronization boundary to determine an end of the synchronization SIFS.

7. The method of claim 3, wherein the exchange includes an acknowledgment from another device after the frame, and wherein determining the duration of the synchronization SIFS includes subtracting a duration of the frame, a predicted duration of the acknowledgment, and a predicted duration of a SIFS from a time of the target synchronization boundary to determine an end of the synchronization SIFS.

8. The method of claim 1, further including adjusting a number of symbols in the frame from the wireless communication device such that a predicted end of the exchange is within one symbol length of the target synchronization boundary.

9. The method of claim 1, further including determining the target synchronization boundary for the exchange.

10. The method of claim 1, wherein the target synchronization boundary is an end of a second exchange on a second link.

11. The method of claim 1, wherein the target synchronization boundary is a coordinated universal time (UTC) schedule.

12. A wireless communication device, comprising:
    at least one modem;
    at least one processor communicatively coupled with the at least one modem; and
    at least one memory communicatively coupled with the at least one processor and storing processor-readable code that, when executed by the at least one processor in conjunction with the at least one modem, is configured to:
        acquire access to a wireless medium via a clear channel assessment (CCA) procedure; and
        transmit, to another device, a frame within an exchange of frames during a transmission opportunity (TxOP) of the wireless communication device after a duration of a synchronization short inter-frame space (SIFS), wherein the duration of the synchronization SIFS enables alignment of an end of the exchange with a target synchronization boundary.

13. The wireless communication device of claim 12, wherein the duration of the synchronization SIFS is between 13 microseconds and 19 microseconds.

14. The wireless communication device of claim 12, wherein the at least one processor is configured to determine the duration of the synchronization SIFS.

15. The wireless communication device of claim 14, wherein the at least one processor is configured to determine an offset between the target synchronization boundary and a symbol granularity of the exchange.

16. The wireless communication device of claim 14, wherein the frame from the wireless communication device is an acknowledgment after the synchronization SIFS that extends the exchange until the target synchronization boundary.

17. The wireless communication device of claim 16, wherein the at least one processor is configured to determine subtract a duration of the acknowledgment from a time of the target synchronization boundary to determine an end of the synchronization SIFS.

18. The wireless communication device of claim 14, wherein the exchange includes an acknowledgment from another device after the frame, and wherein the at least one processor is configured to subtract a duration of the frame, a predicted duration of the acknowledgment, and a predicted duration of a SIFS from a time of the target synchronization boundary to determine an end of the synchronization SIFS.

19. The wireless communication device of claim 12, wherein the at least one processor is configured to adjust a number of symbols in the frame from the wireless communication device such that a predicted end of the exchange is within one symbol length of the target synchronization boundary.

20. The wireless communication device of claim 12, wherein the at least one processor is configured to determine the target synchronization boundary for the exchange.

21. The wireless communication device of claim 12, wherein the target synchronization boundary is an end of a second exchange on a second link.

22. The wireless communication device of claim 12, wherein the target synchronization boundary is a coordinated universal time (UTC) schedule.

23. An apparatus for wireless communication by a wireless communication device, comprising:
    means for acquiring access to a wireless medium via a clear channel assessment (CCA) procedure; and
    means for transmitting, to another device, a frame within an exchange of frames during a transmission opportunity (TxOP) of the wireless communication device after a duration of a synchronization short inter-frame space (SIFS), wherein the duration of the synchronization SIFS enables alignment of an end of the exchange with a target synchronization boundary.

24. The apparatus of claim 23, wherein the duration of the synchronization SIFS is between 13 microseconds and 19 microseconds.

25. The apparatus of claim 23, further including means for determining the duration of the synchronization SIFS.

26. The apparatus of claim 25, wherein the means for determining the duration of the synchronization SIFS is configured to determine an offset between the target synchronization boundary and a symbol granularity of the exchange.

27. The apparatus of claim 25, wherein the frame from the wireless communication device is an acknowledgment after the synchronization SIFS that extends the exchange until the target synchronization boundary.

28. The apparatus of claim 27, wherein the means for determining the duration of the synchronization SIFS is configured to subtract a duration of the acknowledgment from a time of the target synchronization boundary to determine an end of the synchronization SIF S.

29. The apparatus of claim 25, wherein the exchange includes an acknowledgment from another device after the frame, and wherein the means for determining the duration of the synchronization SIFS is configured to subtract a duration of the frame, a predicted duration of the acknowledgment, and a predicted duration of a SIFS from a time of the target synchronization boundary to determine an end of the synchronization SIFS.

30. A non-transitory computer-readable medium including stored instructions for wireless communication by a wireless communication device, executable by a processor to:
  acquire access to a wireless medium via a clear channel assessment (CCA) procedure; and
  transmit, to another device, a frame within an exchange of frames during a transmission opportunity (TxOP) of the wireless communication device after a duration of a synchronization short inter-frame space (SIFS), wherein the duration of the synchronization SIFS enables alignment of an end of the exchange with a target synchronization boundary.

\* \* \* \* \*